(12) United States Patent
Nakabayashi et al.

(10) Patent No.: US 11,180,072 B2
(45) Date of Patent: Nov. 23, 2021

(54) VEHICLE LAMP SYSTEM THAT SIMULTANEOUSLY TURNS ON A TERRITORY LAMP AND A STOP LAMP IN RESPONSE TO DETECTED THIRD PARTY ON PROJECTED COURSE OF VEHICLE

(71) Applicant: KOITO MANUFACTURING CO., LTD., Tokyo (JP)

(72) Inventors: Masaaki Nakabayashi, Shizuoka (JP); Jun Iwasaki, Shizuoka (JP)

(73) Assignee: KOITO MANUFACTURING CO., LTD., Tokyo (JP)

(*) Notice: Subject to any disclaimer, the term of this patent is extended or adjusted under 35 U.S.C. 154(b) by 43 days.

(21) Appl. No.: 16/757,157

(22) PCT Filed: Oct. 16, 2018

(86) PCT No.: PCT/JP2018/038452
§ 371 (c)(1),
(2) Date: Apr. 17, 2020

(87) PCT Pub. No.: WO2019/078193
PCT Pub. Date: Apr. 25, 2019

(65) Prior Publication Data
US 2020/0339031 A1 Oct. 29, 2020

(30) Foreign Application Priority Data

Oct. 19, 2017 (JP) .............................. JP2017-202460

(51) Int. Cl.
*B60Q 1/04* (2006.01)
*B60Q 1/26* (2006.01)
*F16H 61/00* (2006.01)

(52) U.S. Cl.
CPC .............. *B60Q 1/04* (2013.01); *B60Q 1/2607* (2013.01); *F16H 61/00* (2013.01); *B60Q 1/2696* (2013.01);
(Continued)

(58) Field of Classification Search
CPC ....................... B60Q 2300/45; B60Q 2300/50; B60Q 1/525; B60Q 1/50; B60Q 1/04
See application file for complete search history.

(56) References Cited

U.S. PATENT DOCUMENTS

| 7,791,458 B2* | 9/2010 | Shimaoka | B60Q 1/085 340/435 |
| 10,300,846 B2* | 5/2019 | Suzuki | B60Q 1/50 |

(Continued)

FOREIGN PATENT DOCUMENTS

| DE | 102012023630 A1 | 6/2014 |
| EP | 2562039 A2 | 2/2013 |

(Continued)

OTHER PUBLICATIONS

Extended European Search Report issued in corresponding European Application No. 18868081.3; dated Jun. 9, 2021 (8 pages).

(Continued)

*Primary Examiner* — Robert J May
(74) *Attorney, Agent, or Firm* — Osha Bergman Watanabe & Burton LLP

(57) ABSTRACT

Provided is a vehicle lamp system which is used along with a future path calculation section for calculating the future path of a host vehicle and an others-determination section for determining the presence or absence of other traffic in the future path. The vehicle lamp system comprises: a stop lamp; a territory lamp which projects light onto the ground so as to display a territory area T including the future path; and a lamp control section which, when the others-determi- (Continued)

nation section determines that other traffic has entered the future path, turns on the stop lamp and the territory lamp at the same time.

7 Claims, 15 Drawing Sheets

(52) U.S. Cl.
CPC ...... *B60Q 2300/45* (2013.01); *B60Q 2400/50* (2013.01)

(56) References Cited

U.S. PATENT DOCUMENTS

| | | |
|---|---|---|
| 2004/0047161 A1 | 3/2004 | Mochizuki et al. |
| 2013/0058116 A1 | 3/2013 | Galbas et al. |

| | | |
|---|---|---|
| 2018/0319325 A1 | 11/2018 | Tatara et al. |

FOREIGN PATENT DOCUMENTS

| | | |
|---|---|---|
| EP | 3156283 A1 | 4/2017 |
| JP | H09277887 A | 10/1997 |
| JP | 2004103379 A | 4/2004 |
| JP | 2011222377 A | 11/2011 |
| WO | 2017073634 A1 | 5/2017 |

OTHER PUBLICATIONS

International Search Report issued in corresponding International Application No. PCT/JP2018/038452; dated Jan. 8, 2019 (3 pages).
Written Opinion of the International Searching Authority issued in corresponding International Application No. PCT/JP2018/038452; dated Jan. 8, 2019 (3 pages).

\* cited by examiner

VEHICLE LAMP SYSTEM THAT SIMULTANEOUSLY TURNS ON A TERRITORY LAMP AND A STOP LAMP IN RESPONSE TO DETECTED THIRD PARTY ON PROJECTED COURSE OF VEHICLE

TECHNICAL FIELD

The present invention relates to a vehicle lamp system.

BACKGROUND ART

Currently, research on automatic driving technology of an automobile has been actively performed in each country, and legislation for enabling a vehicle to travel on a public road in an automatic driving mode has been studied in each country. Here, the automatic driving mode refers to a mode in which the traveling of the vehicle is automatically controlled. On the other hand, a manual driving mode refers to a mode in which the traveling of the vehicle is controlled by a driver. In an automatic driving vehicle, the traveling of the vehicle is automatically controlled by a computer.

CITATION LIST

Patent Literature

Patent Literature 1: JP-A-H9-277887

SUMMARY OF INVENTION

Technical Problem

However, for example, in a vehicle in which the automatic driving mode is being executed, control may be executed to detect a pedestrian and to stop the vehicle until the pedestrian has left the future course of the vehicle. However, the pedestrian cannot communicate with the driver of the vehicle, and it may not be clear for the pedestrian to understand why the vehicle is stopped.

Therefore, an object of the present invention is to provide a vehicle lamp system that provides a display that allows a third party on a road to easily know why an own vehicle is stopped.

Solution to Problem

In order to solve the above problems, the vehicle lamp is configured to be used together with a future course calculation unit configured to calculate a future course of an own vehicle, and an third party determination unit configured to determine whether a third party on a road is present on the future course. The vehicle lamp system comprises:

a stop lamp;
a territory lamp configured to irradiate a ground with light to display a territory region including the future course; and
a lamp control unit configured to simultaneously turn on the stop lamp and the territory lamp when the third party determination unit determines that the third party on the road has entered the future course.

Effects of Invention

According to the vehicle lamp system of the present invention, a display is provided which allows a third party on a road to easily know why the own vehicle is stopped.

DESCRIPTION OF EMBODIMENTS

Figure 1A:
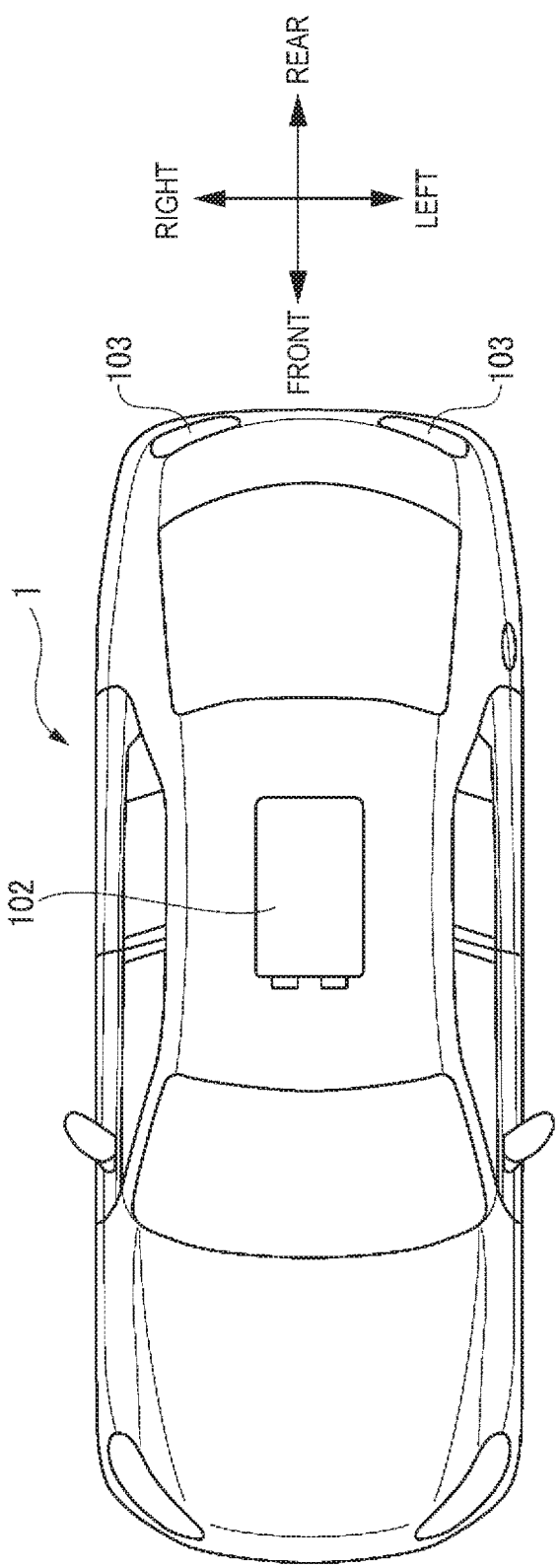
FIG. 1A is a top view of a vehicle including a vehicle lamp system according to an embodiment of the present invention.

Hereinafter, an embodiment of the present invention (hereinafter, referred to as a present embodiment) will be described with reference to the drawings. Descriptions of members having the same reference numerals as members that are already described in the description of the present embodiment will be omitted for convenience of description.

In the description of the present embodiment, a "left-right direction", a "front-rear direction", and an "upper-lower direction" will be referred to as appropriate for convenience of description. These directions are relative directions set for a vehicle 1 shown in FIGS. 1A and 1B. Here, the "upper-lower direction" is a direction including an "upper direction" and a "lower direction". The "front-rear direction" is a direction including a "front direction" and a "rear direction". The "left-right direction" is a direction including a "left direction" and a "right direction".

Figure 1B:
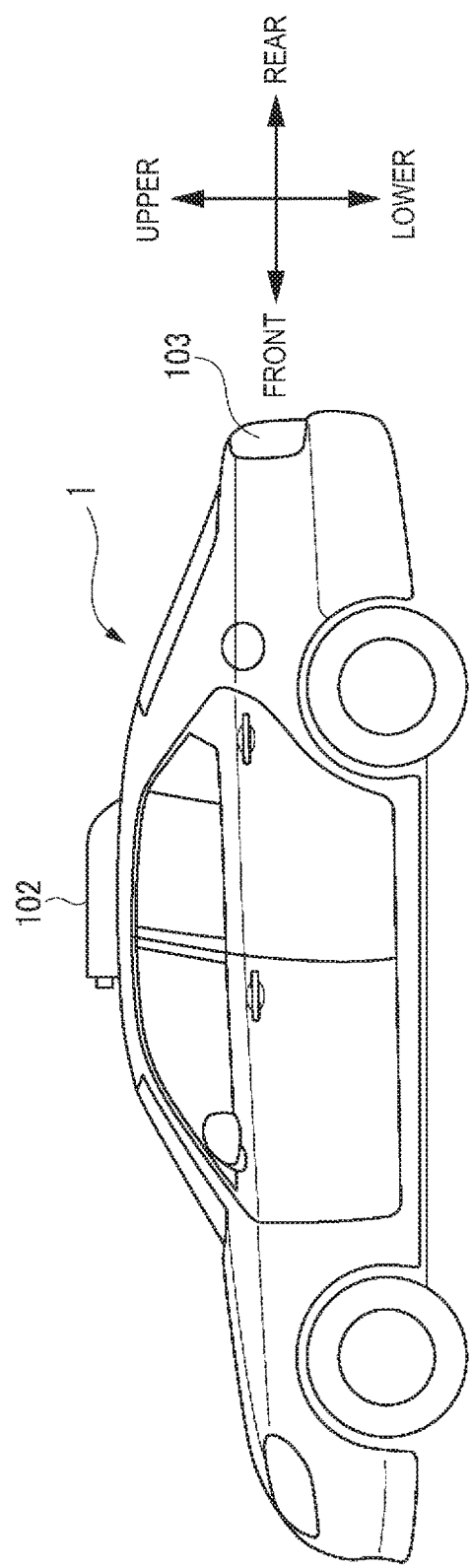
FIG. 1B is a side view of the vehicle including the vehicle lamp system according to the embodiment of the present invention.

FIGS. 1A and 1B show the vehicle 1 on which a vehicle lamp system according to the present embodiment is mounted. FIG. 1A shows a top view of the vehicle 1. FIG. 1B shows a side view of the vehicle 1. The vehicle 1 is an automobile that is travelable in an automatic driving mode. A stop lamp 103 and a territory lamp 102 are mounted on the vehicle 1.

Figure 2:
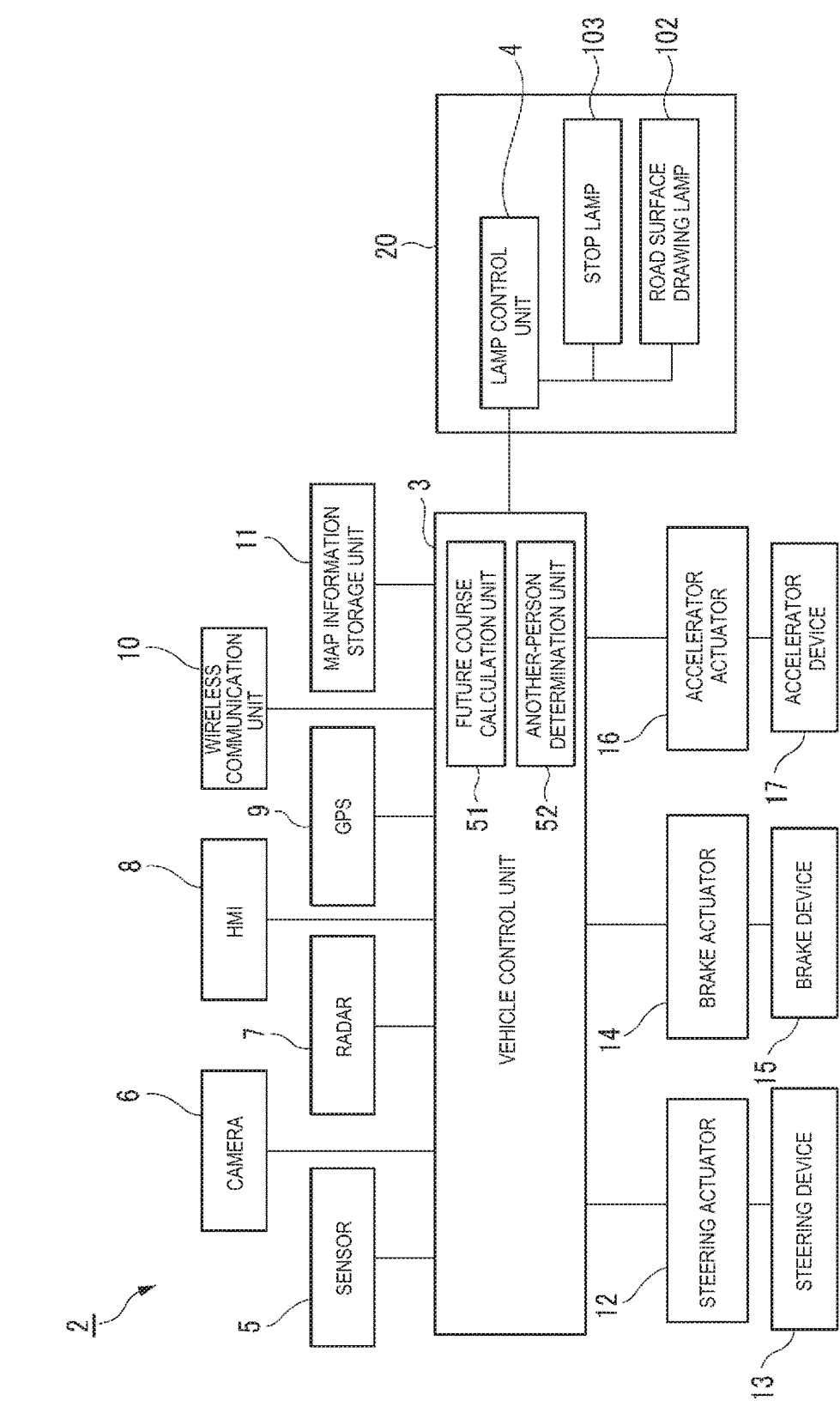
FIG. 2 is a block diagram of a vehicle system and the vehicle lamp system.

FIG. 2 is a block diagram of a vehicle system 2 and a vehicle lamp system 20 that are mounted on the vehicle 1. First, the vehicle system 2 will be described with reference to FIG. 2. As shown in FIG. 2, the vehicle system 2 includes a vehicle control unit 3, a sensor 5, a camera 6, a radar 7, a human machine interface (HMI) 8, a global positioning system (GPS) 9, a wireless communication unit 10, and a map information storage unit 11. Further, the vehicle system 2 includes a steering actuator 12, a steering device 13, a brake actuator 14, a brake device 15, an accelerator actuator 16, and an accelerator device 17.

The vehicle control unit 3 includes an electronic control unit (ECU). The electronic control unit includes (i) a processor such as a central processing unit (CPU), (ii) a read only memory (ROM) in which various vehicle control programs are stored, and (iii) a random access memory (RAM) in which various pieces of vehicle control data is temporarily stored. The processor loads a program designated from the various vehicle control programs stored in the ROM on the RAM, and executes various processings in cooperation with the RAM. The vehicle control unit 3 controls traveling of the vehicle 1 based on external information of the vehicle 1.

The sensor 5 includes an acceleration sensor, a speed sensor, a gyro sensor, and the like. The sensor 5 detects a traveling state of the vehicle 1 and outputs traveling state information to the vehicle control unit 3. The sensor 5 may further include a seating sensor that detects whether a driver is sitting on a driving seat, a face direction sensor that detects a direction of a face of the driver, an outside weather sensor that detects an outside weather state, a human sensor that detects whether a person is present in the vehicle, and the like. Further, the sensor 5 may include an illuminance sensor that detects illuminance of a surrounding environment of the vehicle 1.

The camera 6 is a camera including, for example, an imaging element such as a charge-coupled device (CCD) or a complementary MOS (CMOS). The camera 6 is a camera that detects visible light or an infrared camera that detects infrared rays. The radar 7 is a millimeter-wave radar, a microwave radar, a laser radar, or the like. The camera 6 and the radar 7 detect the surrounding environment of the vehicle 1 (another vehicle, a pedestrian, a road shape, a traffic sign, an obstacle, and the like) and output surrounding environment information to the vehicle control unit 3.

The HMI 8 includes an input unit that receives an input operation from the driver and an output unit that outputs traveling information and the like to the driver. The input unit includes a steering wheel, an accelerator pedal, a brake pedal, a driving mode switching switch configured to switch a driving mode of the vehicle 1, and the like. The output unit is a display configured to display various pieces of traveling information.

The GPS 9 is configured to acquire current position information of the vehicle 1 and output the acquired current position information to the vehicle control unit 3. The wireless communication unit 10 is configured to receive traveling information of another vehicle around the vehicle 1 from another vehicle, and transmit the traveling information of the vehicle 1 to another vehicle (vehicle-to-vehicle communication). Further, the wireless communication unit 10 is configured to receive infrastructure information from infrastructure equipment such as a traffic light or a marker lamp, and transmit the traveling information of the vehicle 1 to the infrastructure equipment (road-to-vehicle communication). The map information storage unit 11 is an external storage device such as a hard disk drive in which map information is stored. The map information storage unit 11 is configured to output the map information to the vehicle control unit 3.

When the vehicle 1 travels in a fully automatic driving mode or an advanced driving support mode, the vehicle control unit 3 automatically generates at least one of a steering control signal, an accelerator control signal, and a brake control signal based on external information such as the traveling state information, the surrounding environment information, the current position information, and the map information. The steering actuator 12 is configured to receive the steering control signal from the vehicle control unit 3 and control the steering device 13 based on the received steering control signal. The brake actuator 14 is configured to receive the brake control signal from the vehicle control unit 3 and control the brake device 15 based on the received brake control signal. The accelerator actuator 16 is configured to receive the accelerator control signal from the vehicle control unit 3 and control the accelerator device 17 based on the received accelerator control signal. In this way, in these modes, the traveling of the vehicle 1 is automatically controlled by the vehicle system 2.

On the other hand, when the vehicle 1 travels in a driving support mode or a fully manual driving mode, the vehicle control unit 3 generates the steering control signal, the accelerator control signal, and the brake control signal in accordance with a manual operation of the driver on the accelerator pedal, the brake pedal, and the steering wheel. In this way, in these modes, since the steering control signal, the accelerator control signal, and the brake control signal are generated by the manual operation of the driver, the traveling of the vehicle 1 is controlled by the driver.

Next, the driving mode of the vehicle 1 will be described. The driving mode includes the fully automatic driving mode, the advanced driving support mode, the driving support mode, and the fully manual driving mode. In the fully automatic driving mode, the vehicle system 2 automatically executes all traveling control of steering control, brake control, and accelerator control, and the driver is not in a state where the vehicle 1 can be driven. In the advanced driving support mode, the vehicle system 2 automatically executes all the traveling control of the steering control, the brake control, and the accelerator control, and the driver does not drive the vehicle 1 although the driver is in a state where the vehicle 1 can be driven. In the driving support mode, the vehicle system 2 automatically executes a part of the traveling control of the steering control, the brake control, and the accelerator control, and the driver drives the vehicle 1 under the driving support of the vehicle system 2. On the other hand, in the fully manual driving mode, the vehicle system 2 does not automatically execute the traveling control, and the driver drives the vehicle 1 without the driving support of the vehicle system 2.

The driving mode of the vehicle 1 may be switched by operating the driving mode switching switch. In this case, the vehicle control unit 3 switches the driving mode of the vehicle 1 among the four driving modes (the fully automatic driving mode, the advanced driving support mode, the driving support mode, and the fully manual driving mode) in accordance with an operation of the driver on the driving mode switching switch. Further, the driving mode of the vehicle 1 may be automatically switched based on information about a travelable section where an automatic driving vehicle can travel and about a traveling prohibited section where the driving of the automatic driving vehicle is prohibited, or based on information about outside weather state. In this case, the vehicle control unit 3 switches the driving mode of the vehicle 1 based on these pieces of external information. Further, the driving mode of the vehicle 1 may be automatically switched by using the seating sensor, the face direction sensor, and the like. In this case, the vehicle control unit 3 switches the driving mode of the vehicle 1 based on output signals from the seating sensor and the face direction sensor.

Next, the vehicle lamp system 20 of the vehicle 1 will be described with reference to FIG. 2. As shown in FIG. 2, the vehicle lamp system 20 includes the stop lamp 103, the territory lamp 102, and a lamp control unit 4 configured to control a lamp including the stop lamp 103 and the territory lamp 102.

The lamp control unit 4 is connected to the vehicle control unit 3, and is configured to control operations of the stop lamp 103 and the territory lamp 102 based on a signal transmitted from the vehicle control unit 3. For example, the lamp control unit 4 controls the stop lamp 103 based on a signal transmitted from the vehicle control unit 3. Further, the lamp control unit 4 may control the territory lamp 102 based on a signal transmitted from the vehicle control unit 3 and may cause light to be emitted such that a predetermined region is displayed by the territory lamp 102.

Figure 3:
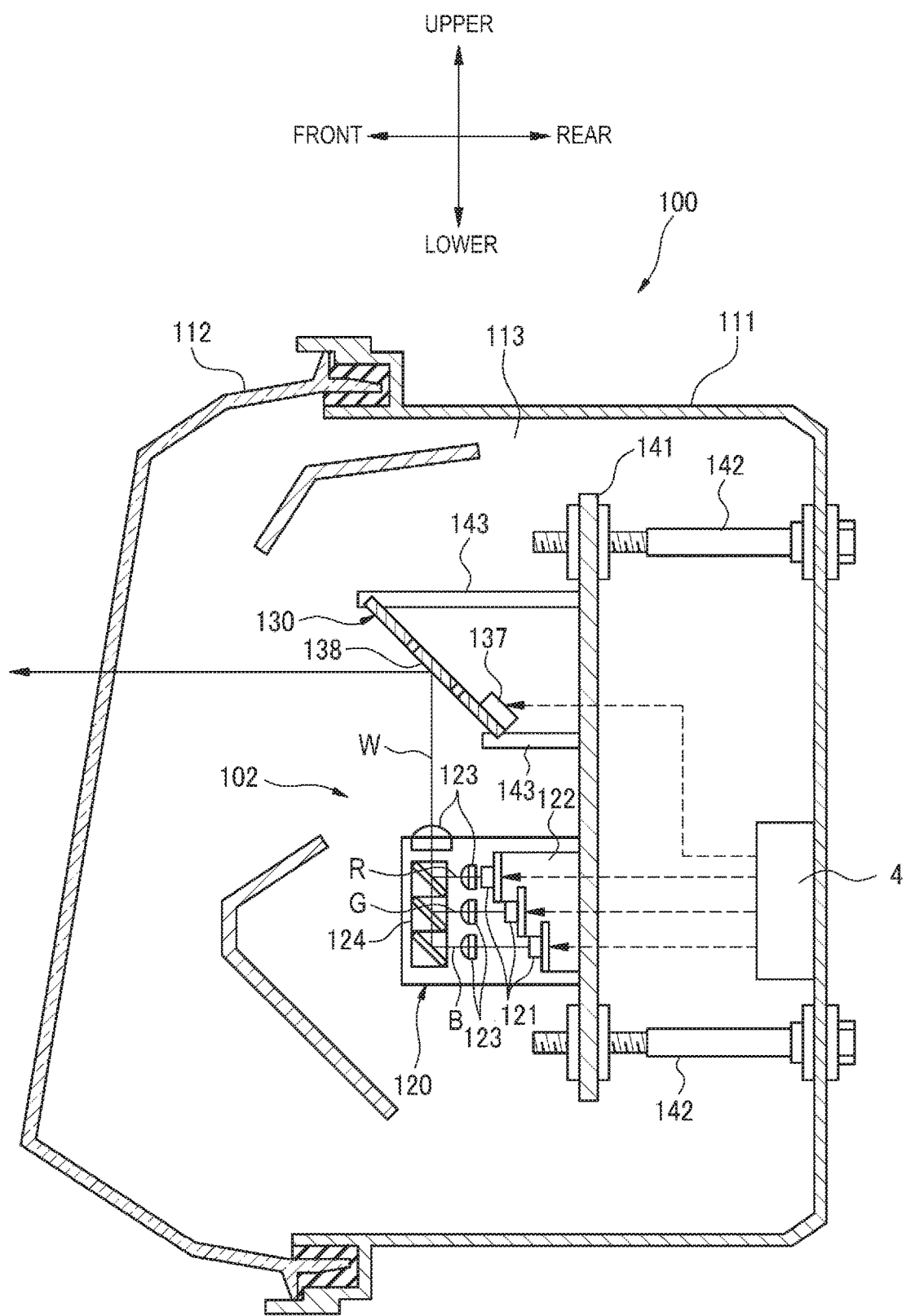
FIG. 3 is a vertical cross-sectional view of a road surface drawing lamp.

FIG. 3 is a vertical cross-sectional view showing a schematic structure of the territory lamp 102. The territory lamp 102 is a lamp that can draw a road surface. As shown in FIG. 3, the territory lamp 102 includes (i) a lamp body 111 including an opening portion on a vehicle front side, and (ii) a transparent front cover 112 attached to cover the opening portion of the lamp body 111.

The territory lamp 102 includes a light source unit 120 and a light distribution unit 130 that reflects light from the light source unit 120. The light source unit 120 and the light distribution unit 130 are supported at predetermined positions in a lamp chamber 113 by a support plate 141. The support plate 141 is attached to the lamp body 111 via aiming screws 142.

The light source unit 120 includes a plurality of (three in this example) light sources 121, a heat sink 122, a plurality of (four in this example) lenses 123, and a light collection unit 124. The light source unit 120 is fixed to a front surface of the support plate 141. The light sources 121 are electrically connected to the lamp control unit 4.

The light distribution unit 130 includes a terminal unit 137 and a reflection mirror 138. A positional relationship between the light distribution unit 130 and the light source unit 120 is determined such that laser light emitted from the light source unit 120 can be reflected toward a front side of the territory lamp 102 via the reflection mirror 138. The light distribution unit 130 is fixed to tip ends of protruding portions 143 that protrude to a front side from the front surface of the support plate 141. The terminal unit 137 is electrically connected to the lamp control unit 4.

The territory lamp 102 is configured such that an optical axis can be adjusted in a horizontal direction and a vertical direction by rotating the aiming screws 142 to adjust a posture of the support plate 141.

Figure 4:
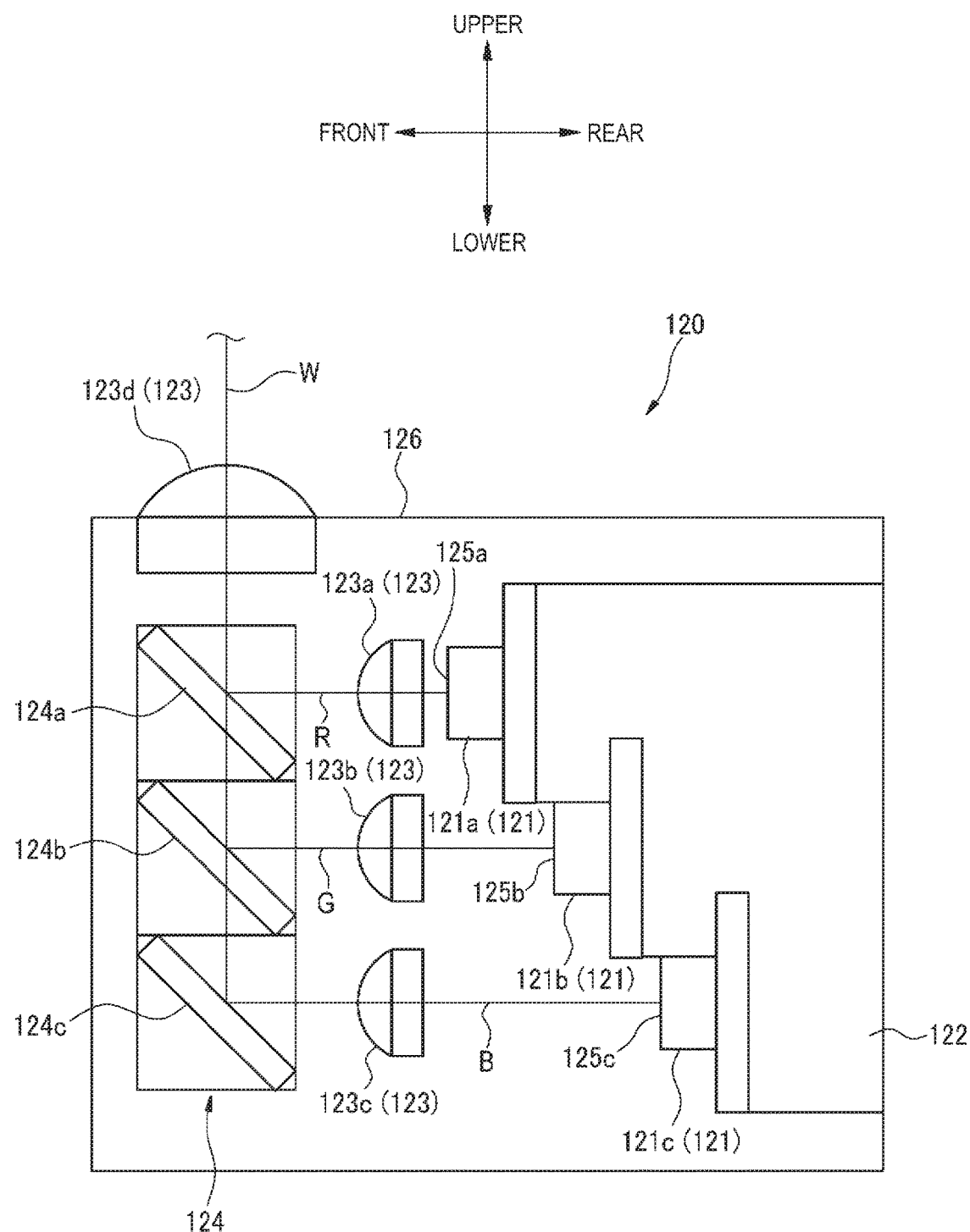
FIG. 4 is a side view showing a configuration of a light source unit of the road surface drawing lamp.

FIG. 4 is a side view of the light source unit 120 that constitutes the territory lamp 102. As shown in FIG. 4, the light source unit 120 includes a first light source 121a, a second light source 121b, a third light source 121c, the heat sink 122, a first lens 123a, a second lens 123b, a third lens 123c, a fourth lens 123d, and the light collection unit 124.

The first light source 121a is a light source that emits red laser light R. The first light source 121a includes a light-emitting element including a red laser diode. Similarly, the second light source 121b includes a green laser diode that emits green laser light G, and the third light source 121c includes a blue laser diode that emits blue laser light B. The first light source 121a, the second light source 121b, and the third light source 121c are arranged such that a laser light-emitting surface 125a, a laser light-emitting surface 125b, and a laser light-emitting surface 125c, which are respective light-emitting surfaces, are parallel to one another. The light-emitting element of each light source is not limited to the laser diode.

The first light source 121a to the third light source 121c are arranged such that the respective laser light-emitting surfaces 125a to 125c face the front side of the territory lamp 102, and are attached to the heat sink 122. The heat sink 122 is formed of a material having high thermal conductivity such as aluminum. The heat sink 122 is attached to the light source unit 120 in a state where a rear side surface of the heat sink 122 is in contact with the support plate 141 (see FIG. 3).

The first lens 123a to the fourth lens 123d include, for example, a collimating lens. The first lens 123a is provided on an optical path of the red laser light R between the first light source 121a and the light collection unit 124, converts the red laser light R emitted from the first light source 121a into parallel light, and emits the parallel light to the light collection unit 124. The second lens 123b is provided on an optical path of the green laser light G between the second light source 121b and the light collection unit 124, converts the green laser light G emitted from the second light source 121b into parallel light, and emits the parallel light to the light collection unit 124.

The third lens 123c is provided on an optical path of the blue laser light B between the third light source 121c and the light collection unit 124, converts the blue laser light B emitted from the third light source 121c into parallel light, and emits the parallel light to the light collection unit 124. The fourth lens 123d is fitted into an opening provided in an upper portion of a housing 126 of the light source unit 120. The fourth lens 123d is provided on an optical path of white laser light W (to be described below) between the light collection unit 124 and the light distribution unit 130 (see FIG. 3), converts the white laser light W emitted from the light collection unit 124 into parallel light, and emits the parallel light to the light distribution unit 130.

The light collection unit 124 collects the red laser light R, the green laser light G, and the blue laser light B to generate the white laser light W. The light collection unit 124 includes a first dichroic mirror 124a, a second dichroic mirror 124b, and a third dichroic mirror 124c.

The first dichroic mirror 124a is at least a mirror that reflects red light and transmits blue light and green light. The first dichroic mirror 124a is disposed to reflect the red laser light R, which passes through the first lens 123a, toward the fourth lens 123d. The second dichroic mirror 124b is at least a mirror that reflects the green light and transmits the blue light. The second dichroic mirror 124b is disposed to reflect the green laser light G, which passes through the second lens 123b, toward the fourth lens 123d. The third dichroic mirror 124c is at least a mirror that reflects the blue light. The third dichroic mirror 124c is disposed to reflect the blue laser light B, which passes through the third lens 123c, toward the fourth lens 123d.

A positional relationship among the first dichroic mirror 124a to the third dichroic mirror 124c is determined such that optical paths of the laser light reflected respectively by the first dichroic mirror 124a to the third dichroic mirror 124c are parallel to one another, and the laser light is collected and incident on the fourth lens 123d. In this example, the first dichroic mirror 124a to the third dichroic mirror 124c are arranged such that regions of the dichroic mirrors 124a to 124c irradiated with the laser light (reflection points of the laser light) are aligned in a straight line.

The blue laser light B emitted from the third light source 121c is reflected by the third dichroic mirror 124c and advances to a second dichroic mirror 124b side. The green laser light G emitted from the second light source 121b is reflected by the second dichroic mirror 124b toward a first dichroic mirror 124a side, and is superimposed on the blue laser light B transmitted through the second dichroic mirror 124b. The red laser light R emitted from the first light source 121a is reflected by the first dichroic mirror 124a toward a fourth lens 123d side, and is superimposed on collected light of the blue laser light B and the green laser light G that are transmitted through the first dichroic mirror 124a. As a result, the white laser light W is formed, and the formed white laser light W passes through the fourth lens 123d and advances to the light distribution unit 130.

Among the first light source 121a to the third light source 121c, the first light source 121a that emits the red laser light R is disposed at a position closest to the light collection unit 124, the third light source 121c that emits the blue laser light B is disposed at a position farthest from the light collection unit 124, and the second light source 121b that emits the green laser light G is disposed at an intermediate position. That is, the first light source 121a to the third light source 121c are arranged at positions closer to the light collection unit 124 as a wavelength of emitted laser light becomes longer.

Figure 5:
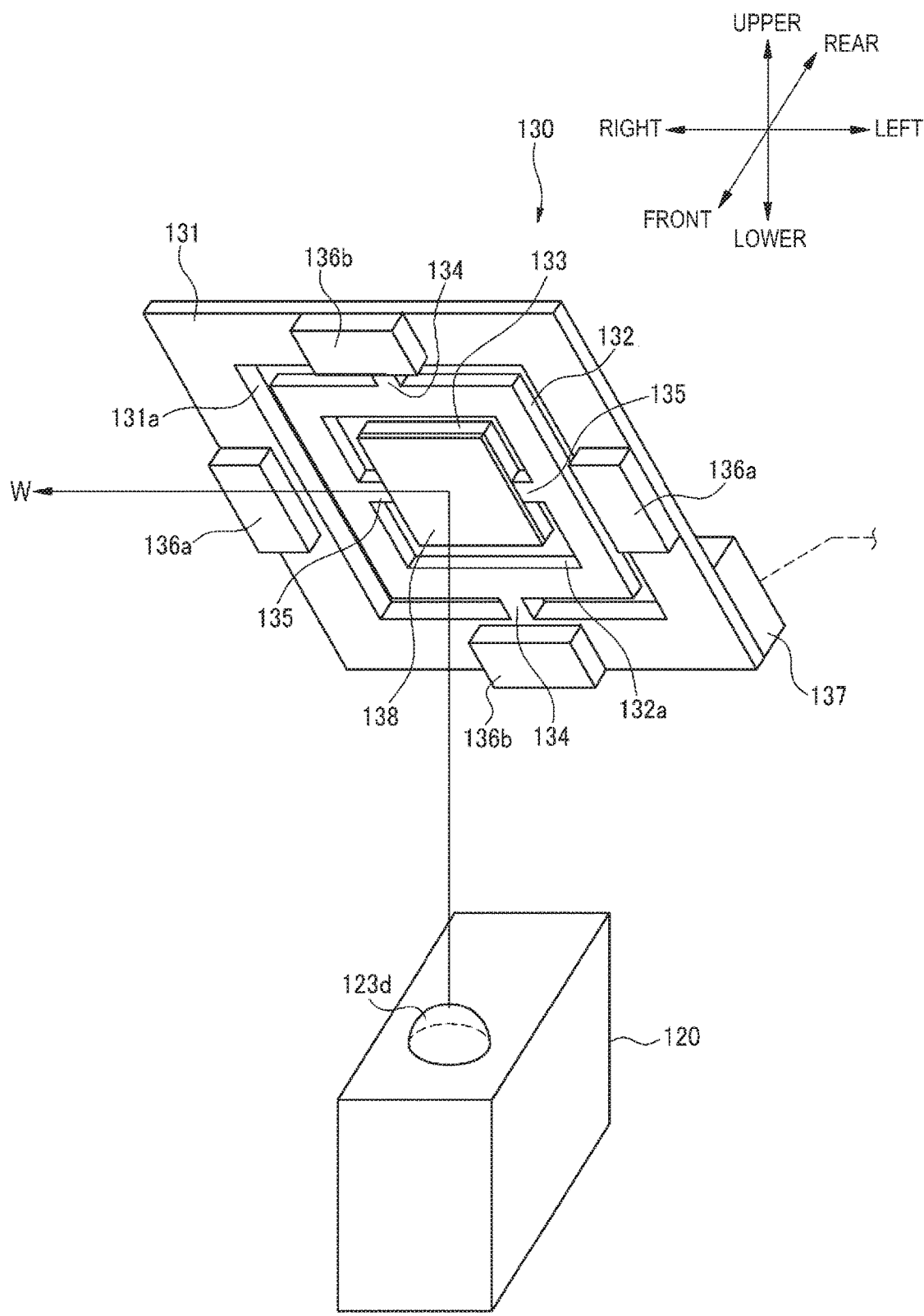
FIG. 5 is a perspective view showing a configuration of a light distribution unit of the road surface drawing lamp.

FIG. 5 is a perspective view when the light distribution unit 130 that constitutes the territory lamp 102 is observed from a front side. As shown in FIG. 5, the light distribution unit 130 includes a base 131, a first rotation body 132, a second rotation body 133, a first torsion bar 134, a second torsion bar 135, permanent magnets 136a and 136b, the terminal unit 137, and the reflection mirror 138. The light distribution unit 130 includes, for example, a galvanometer mirror. The light distribution unit 130 may include, for example, a MEMS mirror.

The base 131 is a frame body including an opening portion 131a at a center. The base 131 is fixed to the protruding portions 143 (see FIG. 3) in a state of being inclined in a front-rear direction of the territory lamp 102. The first rotation body 132 is disposed in the opening portion 131a of the base 131. The first rotation body 132 is a frame body including an opening portion 132a at a center. The first rotation body 132 is supported by the first torsion bar 134, which extends from a rear lower side to a front upper side of the territory lamp 102, to be rotatable left and right (vehicle width direction) with respect to the base 131.

The second rotation body 133 is disposed in the opening portion 132a of the first rotation body 132. The second rotation body 133 is a rectangular flat plate. The second rotation body 133 is supported by the second torsion bar 135, which extends in the vehicle width direction, to be rotatable upper and lower (in a vertical direction) with respect to the first rotation body 132. When the first rotation body 132 rotates left and right with the first torsion bar 134 serving as a rotation axis, the second rotation body 133 rotates left and right together with the first rotation body 132. The reflection mirror 138 is provided on a surface of the second rotation body 133 by plating, vapor deposition, or the like.

The base 131 is provided with a pair of permanent magnets 136a at a position orthogonal to an extending direction of the first torsion bar 134. The permanent magnets 136a form a magnetic field orthogonal to the first torsion bar 134. A first coil (not shown) is wired to the first rotation body 132. The first coil is connected to the lamp control unit 4 via the terminal unit 137. Further, the base 131 is provided with a pair of permanent magnets 136b at a position orthogonal to an extending direction of the second torsion bar 135. The permanent magnets 136b form a magnetic field orthogonal to the second torsion bar 135. A second coil (not shown) is wired to the second rotation body 133. The second coil is connected to the lamp control unit 4 via the terminal unit 137.

When a magnitude and a direction of a current that flows through the first coil and the second coil are controlled, the first rotation body 132 and the second rotation body 133 execute reciprocating rotation in a left-right direction, and the second rotation body 133 independently executes reciprocating rotation in an upper-lower direction. Accordingly, the reflection mirror 138 executes reciprocating rotation in upper-lower and left-right directions.

A positional relationship between the light source unit 120 and the light distribution unit 130 is determined such that laser light emitted from the light source unit 120 is reflected by the reflection mirror 138 toward the front side of the territory lamp 102. The light distribution unit 130 scans a front side of the vehicle 1 with laser light by the reciprocating rotation of the reflection mirror 138. For example, the light distribution unit 130 scans a region of a drawing pattern to be formed with the laser light. Accordingly, a predetermined drawing pattern is formed at the front side of the vehicle 1 by irradiating a region where the drawing pattern is formed with the laser light.

Next, the vehicle lamp system 20 will be described with reference to FIGS. 2, 6, and 7A to 7D.

As shown in FIG. 2, the vehicle lamp system 20 of the present embodiment is used together with the vehicle control unit 3 including a future course calculation unit 51 and an third party determination unit 52. The vehicle lamp system 20 includes the lamp control unit 4, the stop lamp 103, and the territory lamp 102.

The future course calculation unit 51 is configured to calculate a future course of the vehicle 1. The future course refers to a region to be passed by the vehicle 1 after predetermined time has elapsed from present time. For example, the future course refers to a region to be passed by the vehicle 1 within 5 seconds from present time. Further, it is preferable that the future course refers to a region to be passed by the vehicle 1 within 3 seconds from present time. Further, the future course may be defined to refer to a region to be passed by the vehicle 1 within one second from present time. The future course calculation unit 51 is configured to calculate the future course based on information such as a current vehicle speed, a current advancing direction, timing of turning right or left acquired from navigation information, and timing of acceleration or deceleration. The third party determination unit 52 is configured to determine whether there is a third party on a road such as a person or another vehicle in a territory region T including the future course.

Figure 6:
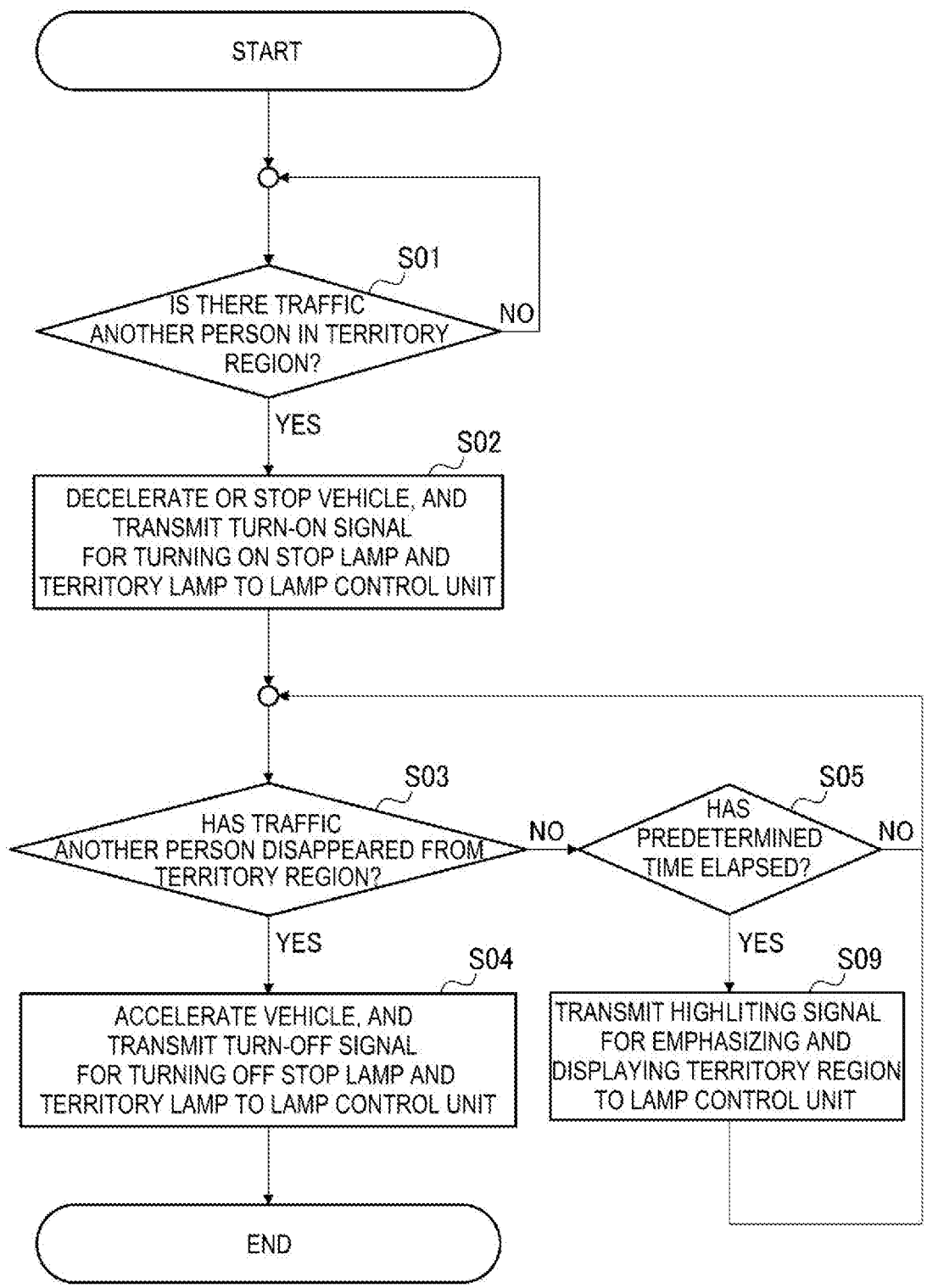
FIG. 6 is a flowchart executed by a vehicle control unit.

FIG. 6 is a flowchart of processes executed by the vehicle lamp system 20 according to the present embodiment. As shown in FIG. 6, first, the third party determination unit 52 determines whether a person is present in the territory region T (step S01). The territory region T will be described with reference to FIGS. 7A to 7D.

FIGS. 7A, 7B, 7C, and 7D show behavior of the own vehicle 1 when the vehicle 1 on which the vehicle lamp system 20 of the present embodiment is mounted detects a pedestrian P. FIGS. 7A, 7B, and 7C or FIGS. 7A, 7B, and 7D show how time elapses in this order.

Figure 7A:
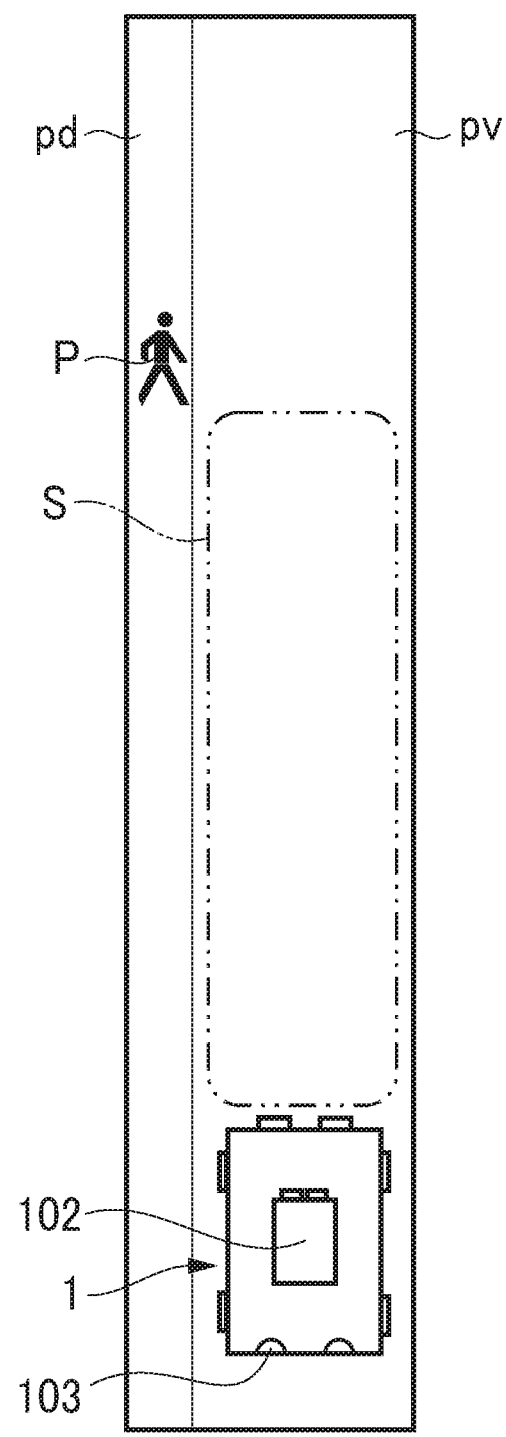
FIG. 7A shows behavior of the own vehicle when a pedestrian is detected.

As shown in FIG. 7A, the vehicle 1 is traveling on a narrow road having a width close to a vehicle width. A future course S of the vehicle 1 at this time is indicated by a two-dot chain line. At a time point of FIG. 7A, the pedestrian P is positioned on a sidewalk pd, and the pedestrian P does not enter the future course S of the vehicle 1 on a roadway pv. Therefore, the third party determination unit 52 determines that there is no person in the territory region T (step S01: No), and does not transmit a signal for turning on the stop lamp 103 and the territory lamp 102 to the lamp control unit 4. Therefore, the future course S indicated by the two-dot chain line is not displayed at the time point of FIG. 7A.

Figure 7B:
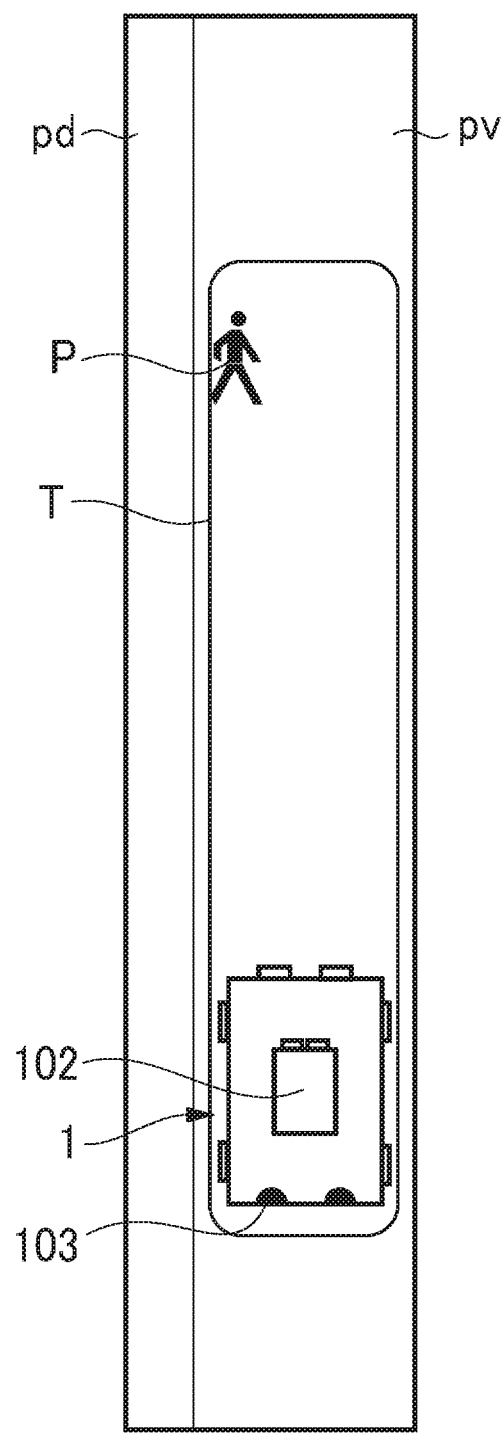
FIG. 7B shows behavior of the own vehicle when the pedestrian is detected.

Next, the processing proceeds from FIG. 7A to FIG. 7B. It is assumed that the pedestrian P moves to the roadway pv and enters the future course S. At this time, the third party determination unit 52 determines that a person is present in the territory region T (step S01: Yes). The vehicle control unit 3 operates a brake to decelerate the vehicle and, in some cases, stop the vehicle. At the same time, the vehicle control unit 3 transmits a turn-on signal for turning on the stop lamp 103 and the territory lamp 102 to the lamp control unit 4 (step S02). When the lamp control unit 4 receives the turn-on signal, the lamp control unit 4 turns on the stop lamp 103 and causes a ground to be irradiated with light such that the territory region T is displayed by the territory lamp 102.

FIG. 7B shows the territory region T displayed by the territory lamp 102. In the present embodiment, the territory lamp 102 irradiates a ground of a region with light in order to indicate the region where the own vehicle 1 does not want another vehicle or another person to enter. The region displayed by the territory lamp 102 is referred to as the territory region T. The territory region T is a region where the own vehicle 1 might be in contact with a person when the own vehicle 1 travels. For example, when there is a person immediately in front of the vehicle when the vehicle is going to move forward, the own vehicle 1 might be in contact with the person. In the present embodiment, the territory region T is a region including the future course S and a region around the own vehicle 1.

A size of the territory region T in the front-rear direction is determined in accordance with the future course S. For example, in a case where the future course is defined as the region to be passed by the vehicle 1 within 5 seconds from present time as described above, a leading edge of the territory region T is a position where a leading edge of the vehicle 1 reaches 5 seconds after present time when the vehicle 1 is going to move to a front side.

The territory region T is a region that extends to a left side within 3 meters, preferably within 1 meter, and more preferably within 0.5 meters from a left edge of the vehicle 1. For example, if the vehicle 1 starts when a person on a left side of the vehicle raises an arm outward toward the vehicle 1, the vehicle 1 might be in contact with the arm of the person.

The territory region T is a region that extends to a right side within 3 meters, preferably within 1 meter, and more preferably within 0.5 meters from a right edge of the vehicle 1. For example, if the vehicle 1 starts when a person on a right side of the vehicle 1 raises an arm outward toward the vehicle 1, the vehicle 1 might be in contact with the arm of the person.

The territory region T for the vehicle 1 that is going to move to a front side is a region that extends to a rear side within 3 meters, preferably within 1 meter, and more preferably within 0.5 meters from a rear edge of the vehicle 1. For example, if the vehicle 1 starts when a person on a rear side of the vehicle 1 raises an arm outward toward the vehicle 1, the vehicle might be in contact with the arm of the person.

By displaying the territory region T, the territory lamp 102 indicates the intention of occupying the territory region T only by the own vehicle 1. The territory lamp 102 may emit light to entire inside of the territory region T or may emit light to display an outer frame of the territory region T. Alternatively, the territory lamp 102 may emit light to display left and right edges of the territory region T. In FIG. 7B, the territory lamp 102 irradiates the ground with light to display the outer frame of the territory region T.

In this way, the territory lamp 102 displays the territory region T to be occupied only by the own vehicle 1, and transmits an intention of asking a third party on a road such as a person or another vehicle to deviate from the territory region T.

Figure 7C:
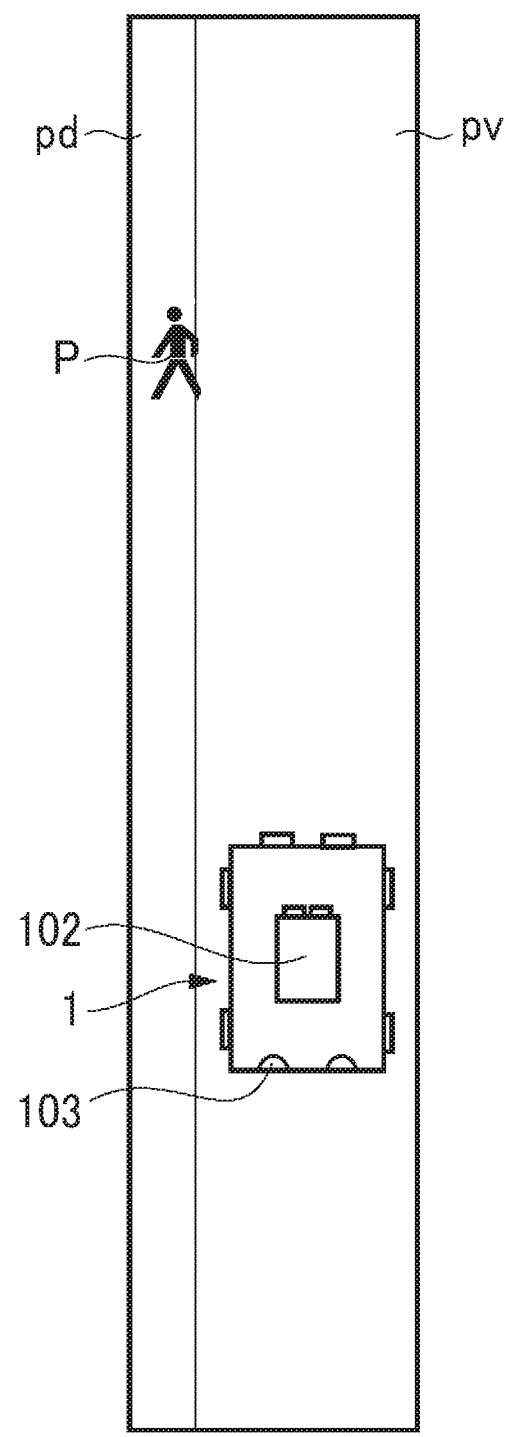
FIG. 7C shows behavior of the own vehicle when the pedestrian is detected.

Referring back to FIG. 6. The third party determination unit 52 determines whether the pedestrian P has left the territory region T (step S03). FIG. 7C shows a state where the pedestrian P has deviated from the territory region T. The third party determination unit 52 determines that the person has left the territory region T (step S03: Yes), and the vehicle control unit 3 accelerates the vehicle 1. At the same time, the vehicle control unit 3 transmits a turn-off signal for turning off the stop lamp 103 and the territory lamp 102 to the lamp control unit 4 (step S04). When receiving the turn-off signal, the lamp control unit 4 turns off the stop lamp 103 and turns off the territory lamp 102. Accordingly, the pedestrian P can know that the presence of the pedestrian P has hindered the traveling of the vehicle 1. Further, it is possible to prevent the pedestrian P from entering the future course.

Figure 7D:
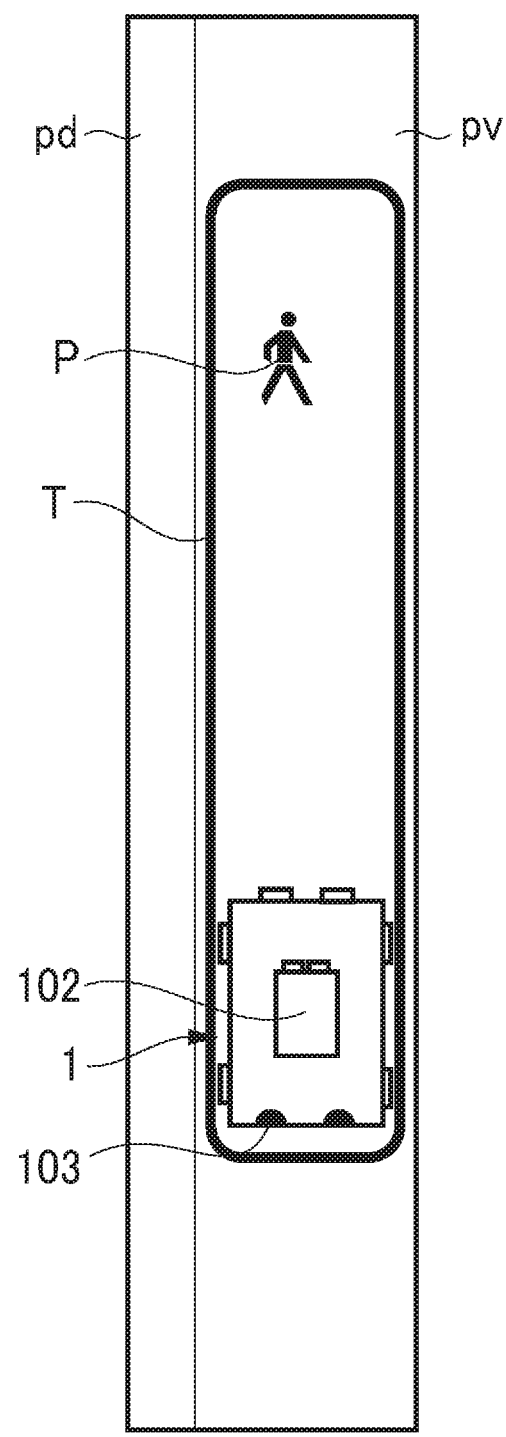
FIG. 7D shows behavior of the own vehicle when the pedestrian is detected.

On the other hand, FIG. 7D shows a state where the pedestrian P is still positioned in the territory region T even after a lapse of time from the state of FIG. 7B. Referring back to FIG. 6. When the third party determination unit 52 determines that the pedestrian P does not leave the territory region T (step S03: No), the vehicle control unit 3 further determines whether a predetermined time has elapsed (step S05). When determining that the pedestrian P does not deviate from the territory region T even after a lapse of the predetermined time (step S05: Yes), the third party determination unit 52 transmits a highlighting signal for highlighting the territory region T to the lamp control unit 4 (step S06).

When the lamp control unit 4 receives the highlighting signal, a frame line is displayed thicker in the present embodiment. Accordingly, the pedestrian P is informed that the pedestrian P might be in contact with the vehicle 1 if the pedestrian P stays in the territory region T, and the pedestrian P is prompted to move out of the territory region T.

The example of highlighting is not limited to that shown in the figure. As a method for highlighting, it is possible to adopt forms such as blinking light for displaying the territory region T, increasing intensity of the light for displaying the territory region T, and changing a color of the light for displaying the territory region T.

In the flowchart shown in FIG. 6, the example is shown in which the territory lamp 102 executes the highlighting when a third party on a road is in the territory region T even after the elapse of the predetermined time. However, the territory lamp 102 may be configured such that a degree of highlighting is increased in accordance with an elapse of time. Alternatively, the lamp control unit 4 may change a display form of the territory lamp 102 in accordance with a relative speed between a third party on a road and the own vehicle 1. For example, the territory lamp 102 may be controlled such that the territory region T is displayed in green if the relative speed between a third party on a road and the own vehicle 1 is relatively low (for example, 10 km/h or less), white when the relative speed is medium (for example, 10-20 km/h), and red when the relative speed is high (for example, 20 km/h or more).

In the embodiment described above, the situation where the territory region T is displayed when the pedestrian P passes across the narrow road has been described. However, as shown in FIG. 8 and FIGS. 9A to 9C, the present invention can be applied to other situations other than such a situation.

Figure 8:
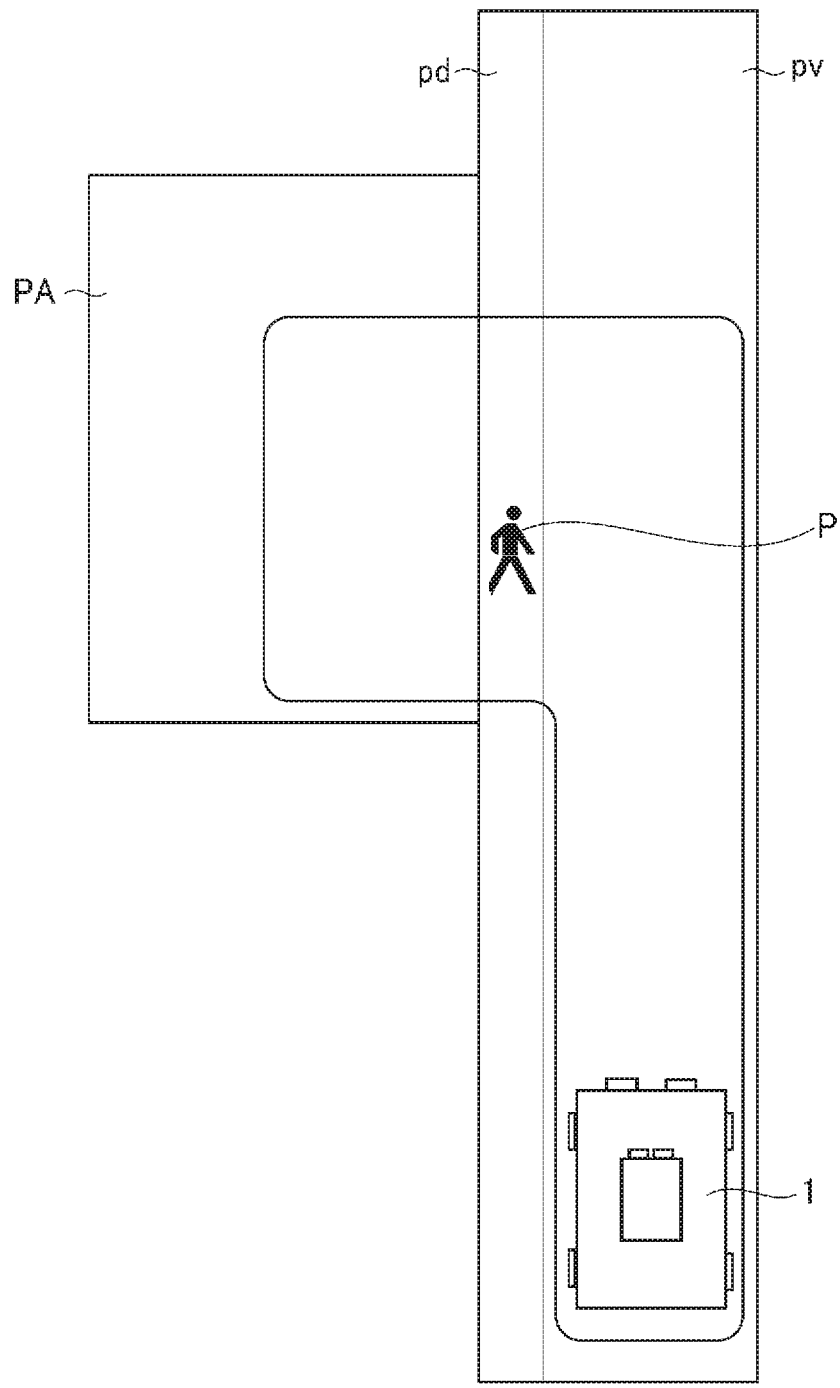
FIG. 8 shows a situation where the own vehicle wants to turn left to cross a sidewalk.

FIG. 8 shows a situation where the vehicle 1 wants to turn left to cross the sidewalk pd in order to enter a parking lot PA positioned on a left side. As shown in FIG. 8, it is assumed that the pedestrian P is positioned on the future course of the vehicle 1. In such a situation, in the vehicle lamp system 20 according to the present embodiment, the third party determination unit 52 detects the presence of a person in the territory region T including the future course and causes the stop lamp 103 and the territory lamp 102 to be simultaneously turned on. Accordingly, the pedestrian P can know that the vehicle 1 wants to enter the parking lot PA, and know that the pedestrian P is positioned on the future course of the vehicle 1. Accordingly, the pedestrian P can know that it is safe if the pedestrian P deviates from the future course. Accordingly, the vehicle 1 can expect that the pedestrian P deviates from the future course.

Figure 9A:
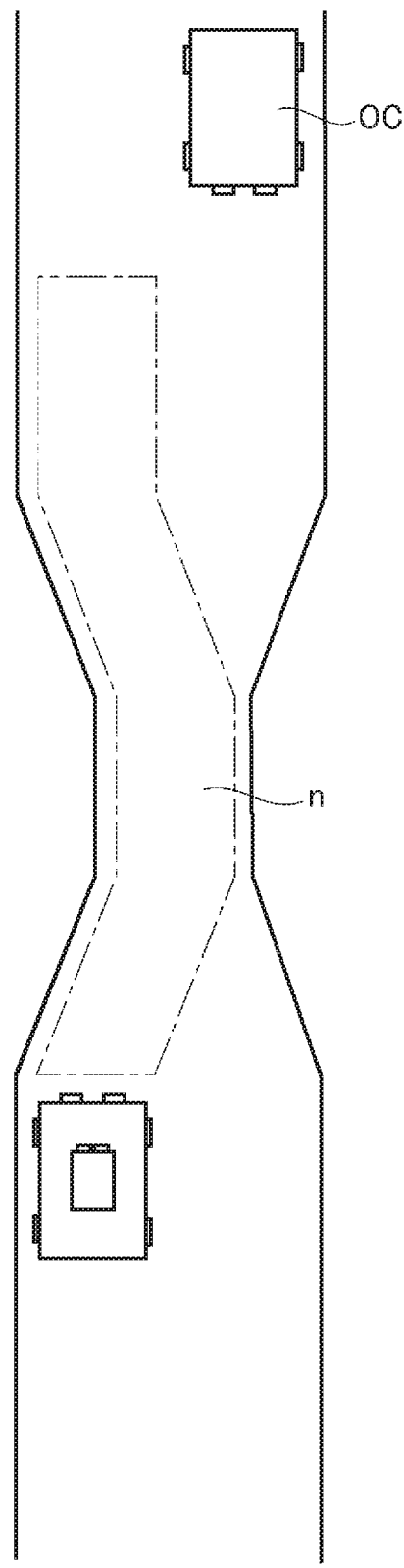
FIG. 9A shows a situation where a narrow road on which the own vehicle and an oncoming vehicle cannot pass each other is present on a future course.
Figure 9B:
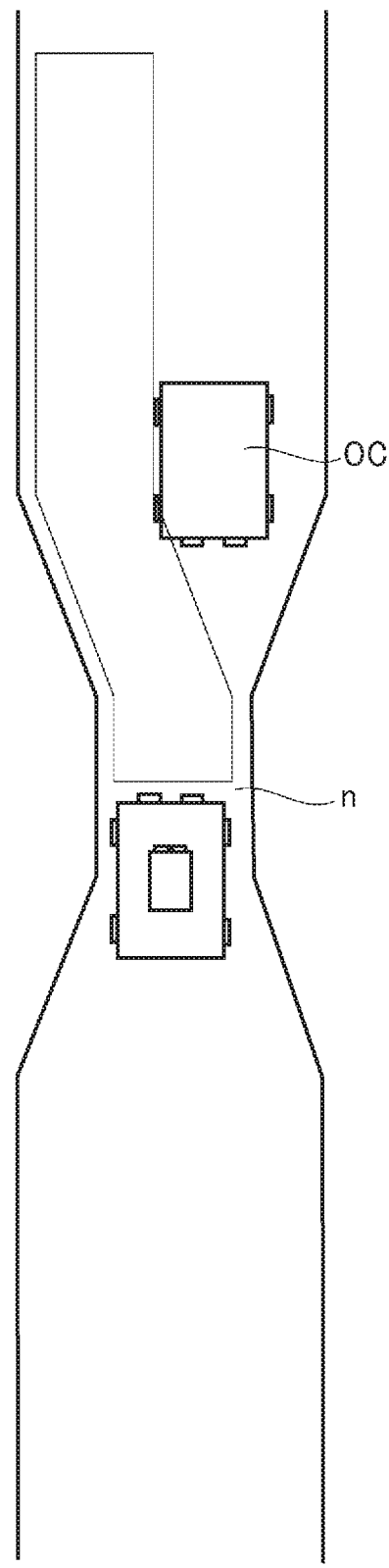
FIG. 9B shows a situation where a narrow road on which the own vehicle and the oncoming vehicle cannot pass each other is present on the future course.
Figure 9C:
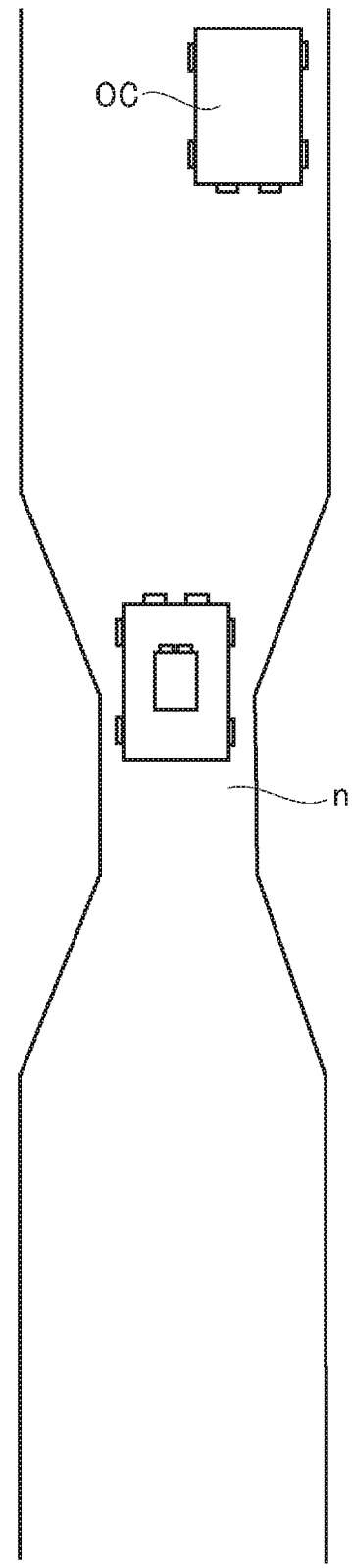
FIG. 9C shows a situation where a narrow road on which the own vehicle and the oncoming vehicle cannot pass each other is present on the future course.

FIGS. 9A, 9B, and 9C show a situation where a narrow road n on which the vehicle 1 and an oncoming vehicle cannot pass each other is present on the future course. It is assumed that another vehicle OC is positioned farther than the narrow road n. In this case, the vehicle control unit 3 determines that the own vehicle 1 can pass through the narrow road n earlier than another vehicle OC, and sets a future course indicated by a two-dot chain line in FIG. 9A.

However, as shown in FIG. 9B, it is assumed that the oncoming vehicle OC has entered the future course while the own vehicle 1 is traveling. In this case, the third party determination unit 52 determines that the oncoming vehicle OC has entered the future course, causes the vehicle 1 to decelerate or stop, and causes the stop lamp 103 and the territory lamp 102 to be turned on. Accordingly, the oncoming vehicle OC can know that the oncoming vehicle OC has entered the future course.

As shown in FIG. 9C, when the oncoming vehicle OC moves backward to a position deviated from the future course, the own vehicle 1 causes the territory lamp 102 to be turned off, causes a display of the territory region T to be turned off, and starts traveling.

According to the vehicle lamp system 20 of the present embodiment, when the third party determination unit 52 determines that a third party on a road has entered the future course, the lamp control unit 4 simultaneously turns on the stop lamp 103 and the territory lamp 102. Therefore, when a third party on a road has entered the future course and it is necessary to decelerate or stop the vehicle 1, it is possible to notify, by turning on the stop lamp 103, a vehicle or the like that approaches from a rear side that the vehicle 1 is decelerating or stopping. Further, it is possible to convey a fact that the traveling of the own vehicle 1 is hindered by a third party on a road being present on the future course of the own vehicle 1, and a fact that the own vehicle 1 wants a third party on a road to deviate from the future course, to a third party on a road who has entered the future course. Accordingly, smooth traffic in a traffic society can be implemented.

Although the embodiment of the present invention has been described, it is needless to say that the technical scope of the present invention should not be interpreted as being limited to the description of the present embodiment. The embodiment is a mere example, and those skilled in the art will understand that the embodiment can be variously changed within the scope of the invention as described in the claims. The technical scope of the present invention should be determined based on the scope of the invention described in the claims and the scope of equivalents thereof.

In the above description, although a form in which the lamp control unit is independent of the vehicle control unit has been described, the present invention is not limited thereto. The lamp control unit may be mounted as a function of the vehicle control unit.

Further, in the above description, although the configuration in which the vehicle control unit includes the future course calculation unit and the third party determination unit has been described, the future course calculation unit and the third party determination unit may be independent of the vehicle control unit. For example, a lamp unit may be mounted with the future course calculation unit and the third party determination unit.

In the present embodiment, although the driving mode of the vehicle is described as including the fully automatic driving mode, the advanced driving support mode, the driving support mode, and the manual driving mode, the driving mode of the vehicle should not be limited to these four modes.

Classification and a display form of the driving mode of the vehicle may be appropriately changed in accordance with laws or rules on automatic driving in each country. Similarly, definitions of the "fully automatic driving mode", the "advanced driving support mode", and the "driving support mode" described in the description of the present embodiment are merely examples, and these definitions may be appropriately changed in accordance with laws or rules on the automatic driving in each country.

In the embodiment described above, although an example in which the territory lamp is mounted on an upper portion of the vehicle has been described, the present invention is not limited thereto. For example, the territory lamp may be mounted on a front portion of the vehicle together with a headlamp. Further, the territory lamp may include a so-called road surface drawing lamp, and may be configured to display a territory region with the headlamp or the like. Further, a specific configuration of the territory lamp is not limited to the configuration described above.

This application is based on Japanese Patent Application 2017-202460, filed on Oct. 19, 2017, and the contents of which are incorporated herein by reference.

INDUSTRIAL APPLICABILITY

According to the present invention, there is provided a vehicle lamp system that executes a display that allows a third party on a road to easily know why an own vehicle is stopped.

REFERENCE SIGNS LIST 1 vehicle
2 vehicle system
3 vehicle control unit
4 lamp control unit
20 vehicle lamp system
51 future course calculation unit
52 third party determination unit
102 territory lamp
103 stop lamp

The invention claimed is:

1. A vehicle lamp system configured to be used together with a future course calculation unit configured to calculate a future course of an own vehicle, and an third party determination unit configured to determine whether a third party on a road is present on the future course, the vehicle lamp system comprising:
   a stop lamp;
   a territory lamp configured to irradiate a ground with light to display a territory region including the future course; and
   a lamp control unit configured to simultaneously turn on the stop lamp and the territory lamp when the third party determination unit determines that the third party on the road has entered the future course.

2. The vehicle lamp system according to claim 1, wherein the lamp control unit is configured to simultaneously turn off the stop lamp and the territory lamp when the third party determination unit determines that the third party on the road has left the future course.

3. The vehicle lamp system according to claim 1, wherein the territory lamp is configured to irradiate the ground with light to display surroundings of the own vehicle as the territory region in addition to the future course.

4. The vehicle lamp system according to claim 1, wherein the lamp control unit is configured to control the territory lamp to emit light in a different aspect in accordance with a distance between the third party on the road and the own vehicle.

5. The vehicle lamp system according to claim 1, wherein the lamp control unit is configured to control the territory lamp to emit light in a different aspect in accordance with staying time of the third party on the road on the future course.

6. The vehicle lamp system according to claim 1, wherein the lamp control unit is configured to control the territory lamp to emit light in a different aspect in accordance with a relative speed between the third party on the road and the own vehicle.

7. The vehicle lamp system according to claim 1, wherein the lamp control unit is configured to control the territory lamp to emit light in a different aspect in accordance with a case where another vehicle is present on the future course and a case where a person is present on the future course.

\* \* \* \* \*